(12) United States Patent  
Musto et al.

(10) Patent No.: US 9,957,814 B2  
(45) Date of Patent: May 1, 2018

(54) GAS TURBINE ENGINE COMPONENT WITH FILM COOLING HOLE WITH ACCUMULATOR

(71) Applicant: United Technologies Corporation, Hartford, CT (US)

(72) Inventors: Clifford J. Musto, West Hartford, CT (US); Sasha M. Moore, East Hartford, CT (US); Thomas N. Slavens, Vernon, CT (US); San Quach, East Hartford, CT (US); Nicholas M. LoRicco, Coventry, CT (US); Timothy J. Jennings, South Windsor, CT (US); John McBrien, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 535 days.

(21) Appl. No.: 14/827,453

(22) Filed: Aug. 17, 2015

(65) Prior Publication Data
US 2016/0177737 A1   Jun. 23, 2016

Related U.S. Application Data

(60) Provisional application No. 62/045,703, filed on Sep. 4, 2014.

(51) Int. Cl.
*F01D 5/18* (2006.01)
*F01D 9/04* (2006.01)
(Continued)

(52) U.S. Cl.
CPC ............. *F01D 5/187* (2013.01); *F01D 5/186* (2013.01); *F01D 9/041* (2013.01); *F01D 11/08* (2013.01);
(Continued)

(58) Field of Classification Search
CPC .......... F01D 5/186; F01D 5/187; F01D 25/12; F05D 2250/52; F05D 2260/202; Y02T 50/676
See application file for complete search history.

(56) References Cited

U.S. PATENT DOCUMENTS 4,669,957 A * 6/1987 Phillips .................. F01D 5/186
  415/115
4,684,323 A    8/1987 Field
(Continued)

FOREIGN PATENT DOCUMENTS

| EP | 0227578 | 7/1987 |
| GB | 2262314 | 6/1993 |
| WO | 9914465 | 3/1999 |

OTHER PUBLICATIONS

Extended European Search Report for European Application No. 15183638.4, dated Jan. 28, 2016.

*Primary Examiner* — Ninh H Nguyen
(74) *Attorney, Agent, or Firm* — Carlson, Gaskey & Olds, P.C.

(57) ABSTRACT

A gas turbine engine component includes a wall that provides an exterior surface and an interior flow path surface. A film cooling hole extends through the wall and is configured to fluidly connect the interior flow path surface to the exterior surface. The film cooling hole has a pocket that faces the interior flow path and extends substantially in a longitudinal direction. The film cooling hole has a portion downstream from the pocket and is arranged at an angle relative to the longitudinal direction and extends to the exterior surface.

15 Claims, 4 Drawing Sheets

(51) Int. Cl.
*F01D 11/08* (2006.01)
*F04D 29/32* (2006.01)
*F04D 29/54* (2006.01)
*F04D 29/58* (2006.01)

(52) U.S. Cl.
CPC ......... *F04D 29/324* (2013.01); *F04D 29/542* (2013.01); *F04D 29/582* (2013.01); *F05D 2220/32* (2013.01); *F05D 2240/81* (2013.01); *F05D 2250/314* (2013.01); *F05D 2260/202* (2013.01); *Y02T 50/673* (2013.01); *Y02T 50/676* (2013.01)

(56) References Cited

U.S. PATENT DOCUMENTS

| | | | |
|---|---|---|---|
| 4,770,608 A * | 9/1988 | Anderson | F01D 5/186 415/115 |
| 5,624,231 A | 4/1997 | Ohtomo et al. | |
| 5,688,104 A * | 11/1997 | Beabout | F01D 5/187 415/115 |
| 6,918,742 B2 * | 7/2005 | Liang | F01D 5/186 415/115 |
| 7,351,036 B2 | 4/2008 | Liang | |
| 7,717,676 B2 | 5/2010 | Cunha et al. | |
| 7,866,950 B1 | 1/2011 | Wilson, Jr. | |
| 8,047,789 B1 | 11/2011 | Liang | |
| 8,057,183 B1 | 11/2011 | Liang | |
| 8,066,483 B1 | 11/2011 | Liang | |
| 8,092,176 B2 | 1/2012 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 8,672,613 B2 | 3/2014 | Bunker | |
| 2007/0148029 A1 | 6/2007 | Liang | |
| 2010/0003619 A1 | 1/2010 | Das et al. | |
| 2012/0087803 A1 | 4/2012 | Butler et al. | |
| 2012/0272521 A1 | 11/2012 | Lee et al. | |
| 2013/0205791 A1 | 8/2013 | Mongillo, Jr. et al. | |
| 2013/0280093 A1 | 10/2013 | Zelesky et al. | |
| 2014/0219814 A1 * | 8/2014 | Heselhaus | F01D 5/186 416/96 R |

* cited by examiner

GAS TURBINE ENGINE COMPONENT WITH FILM COOLING HOLE WITH ACCUMULATOR

CROSS-REFERENCE TO RELATED APPLICATIONS

This application claims priority to U.S. Provisional Application No. 62/045,703, which was filed on Sep. 4, 2014 and is incorporated herein by reference.

BACKGROUND

This disclosure relates to a gas turbine engine component, such as a turbine airfoil. Particularly, the disclosure relates to a film cooling hole used to communicate fluid from an internal passageway to an exterior surface.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The advancement of turbomachinery performance is linked to both the over-all pressure ratio of the machine and the turbine inlet temperature that can be reliably sustained during service. Increases in efficiency through either of these methods typically produces a hotter operating environment for turbine flow path hardware in which the working fluid is typically several hundreds of degrees hotter than the melting point of the component alloys. Dedicated cooling air is extracted from the compressor and used to cool the gas path components in the turbine, which can incur significant cycle penalties.

For extremely high temperature applications, film cooling is typically utilized along with backside convection. This method uses cooling air delivered internal of the component and expelled through holes in the exterior airfoil surface to provide a cooling flow over the external surface that reduces the local external surface temperatures downstream. Typically cooling holes are machined into the part and are round or diffuser shaped as permitted by a typical laser or EDM machining process.

SUMMARY

In one exemplary embodiment, a gas turbine engine component includes a wall that provides an exterior surface and an interior flow path surface. A film cooling hole extends through the wall and is configured to fluidly connect the interior flow path surface to the exterior surface. The film cooling hole has a pocket that faces the interior flow path and extends substantially in a longitudinal direction. The film cooling hole has a portion downstream from the pocket and is arranged at an angle relative to the longitudinal direction and extends to the exterior surface.

In a further embodiment of the above, the gas turbine engine component is a turbine airfoil and the exterior surface is an exterior airfoil surface.

In a further embodiment of any of the above, the portion includes a metering hole that provides an inlet at the pocket. The portion has a diffuser that provides the exit and is arranged downstream from the metering hole at the exterior surface.

In a further embodiment of any of the above, the pocket provides an opening in the interior flow path surface that is larger than the inlet.

In a further embodiment of any of the above, the angle is in a range of 70°-179°.

In a further embodiment of any of the above, the interior flow path surface faces a cooling passage that extends in the longitudinal direction.

In a further embodiment of any of the above, the portion is configured to extend is a direction that corresponds to a core gas flow over the exterior surface.

In a further embodiment of any of the above, the pocket has a pocket surface. The diffuser has a first diffuser surface. The pocket surface and first diffuser surface are on a same side of the wall. The pocket surface and the first diffuser surface are at a first angle relative to one another in a range of 165°-180°.

In a further embodiment of any of the above, the portion extends along a centerline. The diffuser has a second diffuser surface at an obtuse angle relative to adjacent exterior surface. The centerline and the second diffuser surface are at a second angle relative to one another in a range of 0°-15°.

In another exemplary embodiment, a gas turbine engine includes a compressor section, a turbine section and a component that is arranged in one of the compressor and turbine sections. The component includes a wall that provides an exterior surface and an interior flow path surface. A film cooling hole extends through the wall and is configured to fluidly connect the interior flow path surface to the exterior surface. The film cooling hole has a pocket facing the interior flow path and extends in a longitudinal direction. The film cooling hole has a portion downstream from the pocket and is arranged at an angle relative to the longitudinal direction and extends to the exterior surface.

In a further embodiment of the above, the component is arranged in the turbine section.

In a further embodiment of any of the above, the exterior surface is an exterior airfoil surface.

In a further embodiment of any of the above, the portion includes a metering hole that provides an inlet at the pocket. The portion has a diffuser that provides the exit that is arranged downstream from the metering hole at the exterior surface.

In a further embodiment of any of the above, the pocket provides an opening in the interior flow path surface that is larger than the inlet.

In a further embodiment of any of the above, the angle in a range of 70°-179°.

In a further embodiment of any of the above, the interior flow path surface faces a cooling passage that extends in the longitudinal direction.

In a further embodiment of any of the above, the portion is configured to extend is a direction that corresponds to a core gas flow over the exterior surface.

In a further embodiment of any of the above, the pocket has a pocket surface and the diffuser has a first diffuser surface. The pocket surface and first diffuser surface are on a same side of the wall. The pocket surface and the first diffuser surface are at a first angle relative to one another in a range of 165°-180°.

In a further embodiment of any of the above, the portion extends along a centerline. The diffuser has a second diffuser surface at an obtuse angle relative to adjacent exterior surface. The centerline and the second diffuser surface are at a second angle relative to one another in a range of 0°-15°.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
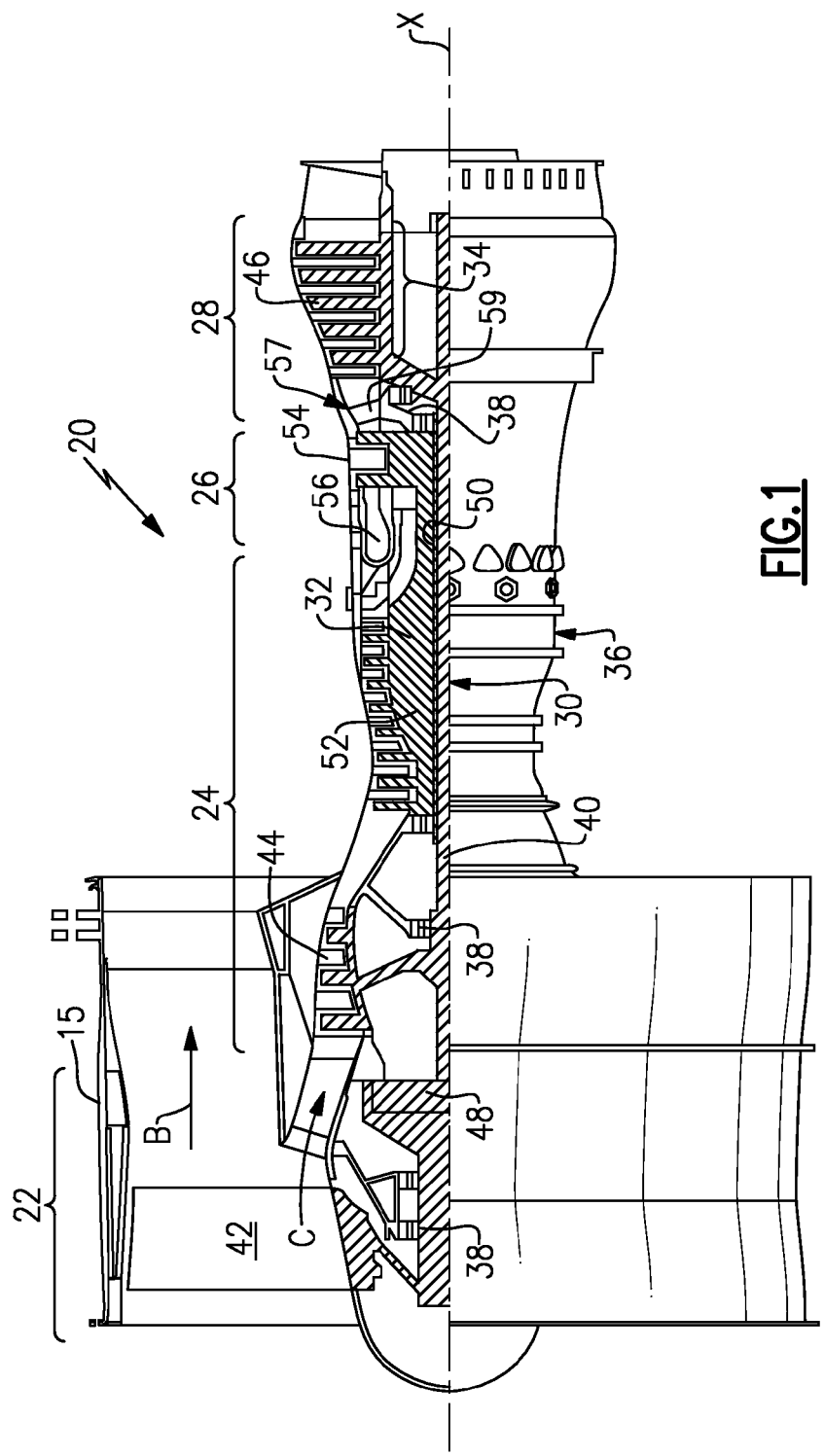
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \, °R)/(518.7° \, R)]^{0.5}$. The "Low corrected fan tip speed" as disclosed herein according to one non-limiting embodiment is less than about 1150 ft/second (350.5 meters/second).

Figure 2A:
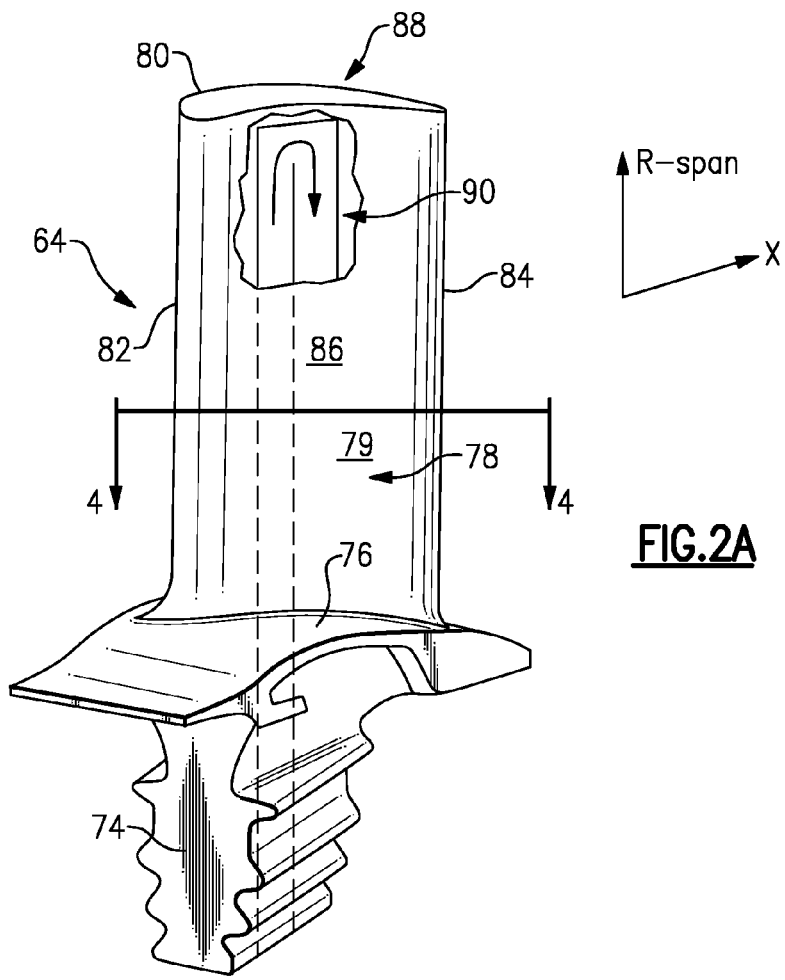
FIG. 2A is a perspective view of an airfoil having the disclosed film cooling hole arrangement.

Referring to FIG. 2A, a serpentine cooling passage 90 may be used in various gas turbine engine components. This passage or another passage may be used to feed cooling fluid to film cooling holes that extend to the exterior airfoil surface. For exemplary purposes, a turbine blade 64 is described. It should be understood that the film cooling hole configuration may also be used for other gas turbine engine components, such as in vanes, blade outer air seals, and turbine platforms, for example.

Figure 2B:
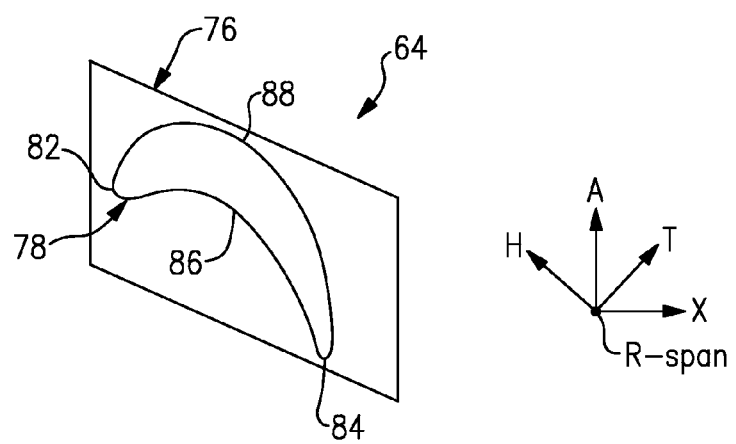
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface 79 extending in a chord-wise direction H from a leading edge 82 to a trailing edge 84. The airfoil 78 is provided between pressure (typically concave) and suction (typically convex) wall 86, 88 in an airfoil thickness direction T, which is generally perpendicular to the chord-wise direction H. Multiple turbine blades 64 are arranged circumferentially in a circumferential direction A. The airfoil 78 extends from the platform 76 in the radial direction R, or spanwise, to the tip 80.

The cooling passage 90 is provided between the pressure and suction walls 86, 88. The exterior airfoil surface may include multiple film cooling holes 92 in fluid communication with the cooling passage 90, best shown in FIGS. 3-5.

Figure 3:
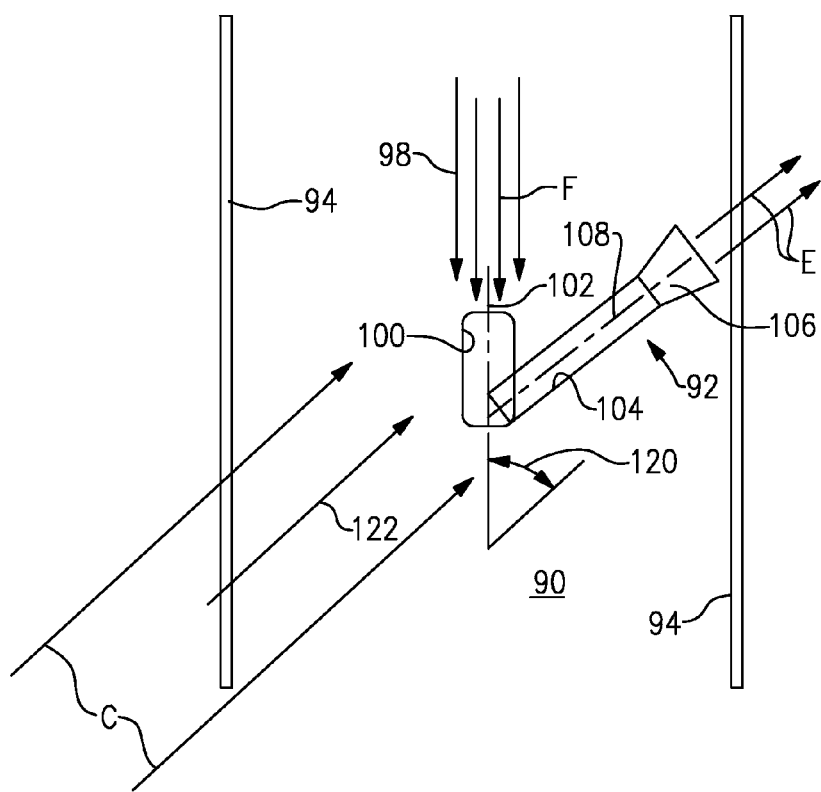
FIG. 3 is a cross-sectional view through a wall of a gas turbine engine component having the film cooling hole taken along line 3-3 in FIG. 4.

FIG. 3 is a cross-sectional view through a wall 94 of a gas turbine engine component, such as the turbine blade shown in FIGS. 2A-2B. The wall 94 provides the exterior surface 79 and an interior flow path surface 96 facing the cooling passage 90, which extends in a longitudinal direction 98.

Figure 4:
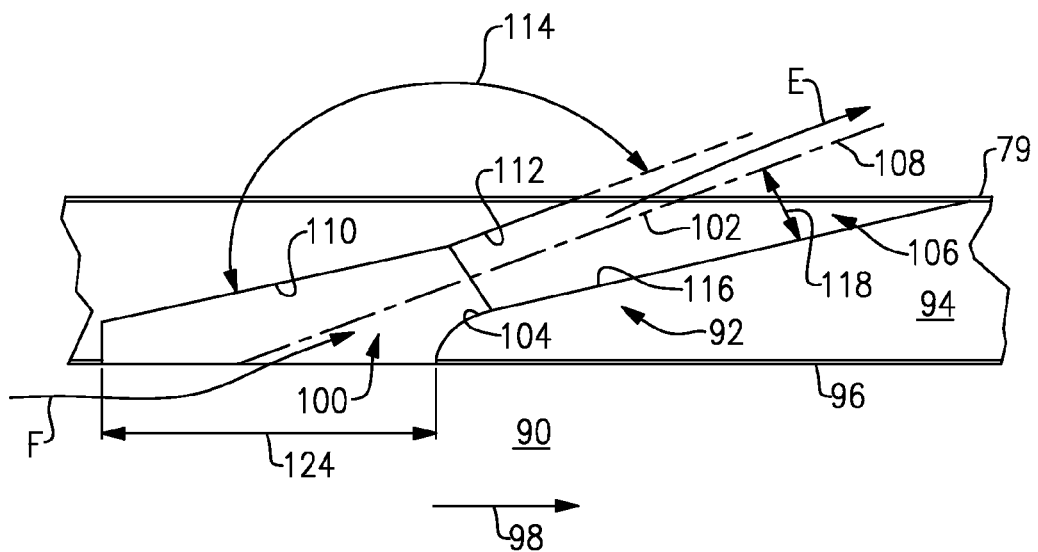
FIG. 4 is another cross-sectional view through the film cooling hole at its inlet take along line 4-4 in FIG. 3.
Figure 5:
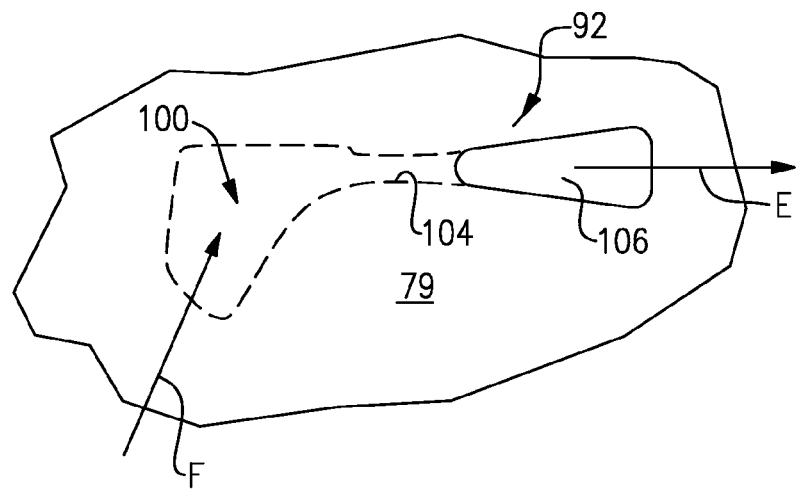
FIG. 5 is a plan view of an exterior surface of the gas turbine engine component.

The film cooling hole 92 extends through the wall 94 and is configured to fluidly connect the interior flow path surface 96 to the exterior surface 79. The film cooling hole 92 has a pocket 100 facing the interior flow path 96 and extends substantially in the longitudinal direction 98. In the example, the pocket 100 extends in the longitudinal direction 98 a greater amount than in a direction normal to the longitudinal direction. The film cooling hole 92 includes a portion, such as metering hole 104 and diffuser 106, downstream from the pocket 100. The portion is arranged has a centerline 108 at an angle 120 relative to the longitudinal direction 98 and extends to the exterior surface 79, as best shown in FIG. 4. In one example, the angle 120 is in a range of 70°-179°.

In the example, the portion includes a metering hole 104 providing an inlet at the pocket 100. The portion has a diffuser 106 providing the exit arranged downstream from the metering hole 104 at the exterior surface 79. The pocket 100 provides an opening in the interior flow path surface 96 that is larger than the inlet of the metering hole 104.

The portion, in the example, the metering hole 104 and diffuser 106, is configured to extend is a direction 122 corresponding to a core gas flow C over the exterior surface 79, as shown in FIG. 3. As a result, the cooling film flow E exiting the diffuser 106 is oriented in generally the same direction as the flow of core gas flow C.

Referring to FIG. 4, the pocket 100 has a pocket surface 110, and the diffuser 106 has a first diffuser surface 112. The pocket surface 110 and the first diffuser surface 112 are arranged on a same side of the wall 94. The pocket surface 110 and the first diffuser surface 112 are arranged at a first angle 114 relative to one another in a range of 165°-180°.

The portion extends along a centerline 108, and the diffuser 106 has a second diffuser surface 116 at an obtuse angle relative to adjacent exterior surface 79. The centerline 108 and the second diffuser surface 116 are arranged at a second angle 118 relative to one another in a range of 0°-15°.

The disclosed film cooling hole 92 utilizes an in-wall swept pocket 100 to take a cooling flow F with an angle 120 significantly different from that of the external gas-path locally to the exit of the film cooling hole 92. The pocket 100 as shown includes a diffuser 106 within the wall 94 of the airfoil with an aerodynamic sweep oblong to the hole main flow vector. This pocket 100 serves to cause a high-pressure accumulation of fluid and turn it in such a way that the flow attaches to the wall of the metering hole 104 of the film hole.

The in-wall pocket 100 is forward and off-angle of the main vector of the cooling hole to expand and slow flow. At the same time using a gradual accumulator wall, or pocket surface 110, to not only cause a local high-pressure feed into the metering hole 104 but also turn the flow in the direction of the main vector, or centerline 102, of the metering hole 104. This in-wall diffusion coupled with turning allows for a good flow attachment to the surfaces of the film cooling hole 92 when the hole lies significantly off-angle from the main direction of cooling flow in the supply channel.

The film cooling hole 92 may be formed using by conventional casting technologies when possible. In some cases, it may be difficult to form these features using conventional casting technologies. Thus, an additive manufacturing process may be used.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine component comprising:
   a wall providing an exterior surface and an interior flow path surface extending in a longitudinal direction;
   a film cooling hole extending through the wall and configured to fluidly connect the interior flow path surface to the exterior surface, the film cooling hole having a pocket facing the interior flow path and extending substantially in the longitudinal direction, the film cooling hole having a portion downstream from the pocket and arranged at an angle relative to the longitudinal direction and extending to the exterior surface, the portion having an inlet at the pocket and extending to the exterior surface, wherein the pocket provides an opening in the interior flow path surface that is larger than the inlet, the pocket extends substantially in the longitudinal direction, extending in the longitudinal direction a greater amount than in a direction normal to the longitudinal direction, and the portion extends lateral at an angle in a range of 70°-179° relative to the longitudinal direction.

2. The gas turbine engine component according to claim 1, wherein the gas turbine engine component is a turbine airfoil, and the exterior surface is an exterior airfoil surface.

3. The gas turbine engine component according to claim 1, wherein the portion includes a metering hole providing an inlet at the pocket, and the portion has a diffuser providing the exit arranged downstream from the metering hole at the exterior surface.

4. The gas turbine engine component according to claim 3, wherein the portion extends along a centerline, and the diffuser has a second diffuser surface at an obtuse angle relative to adjacent exterior surface, the centerline and the second diffuser surface at a second angle relative to one another in a range of 0°-15°.

5. The gas turbine engine component according to claim 1, wherein the interior flow path surface faces a cooling passage that extends in the longitudinal direction.

6. The gas turbine engine component according to claim 1, wherein the portion is configured to extend is a direction corresponding to a core gas flow over the exterior surface.

7. A gas turbine engine component comprising:
a wall providing an exterior surface and an interior flow path surface;
a film cooling hole extending through the wall and configured to fluidly connect the interior flow path surface to the exterior surface, the film cooling hole having a pocket facing the interior flow path and extending substantially in a longitudinal direction, the film cooling hole having a portion downstream from the pocket and arranged at an angle relative to the longitudinal direction and extending to the exterior surface, wherein the portion includes a metering hole providing an inlet at the pocket, and the portion has a diffuser providing the exit arranged downstream from the metering hole at the exterior surface, wherein the pocket has a pocket surface, and the diffuser has a first diffuser surface, the pocket surface and first diffuser surface on a same side of the wall, the pocket surface and the first diffuser surface at a first angle relative to one another in a range of 165°-180°.

8. A gas turbine engine comprising:
a compressor section;
a turbine section; and
a component arranged in one of the compressor and turbine sections, the component including:
a wall providing an exterior surface and an interior flow path surface extending in a longitudinal direction;
a film cooling hole extending through the wall and configured to fluidly connect the interior flow path surface to the exterior surface, the film cooling hole having a pocket facing the interior flow path and extending in the longitudinal direction, the film cooling hole having a portion downstream from the pocket and arranged at an angle relative to the longitudinal direction and extending to the exterior surface, the portion having an inlet at the pocket and extending to the exterior surface, wherein the pocket provides an opening in the interior flow path surface that is larger than the inlet, the pocket extends substantially in the longitudinal direction, extending in the longitudinal direction a greater amount than in a direction normal to the longitudinal direction, and the portion extends lateral at an angle in a range of 70°-179° relative to the longitudinal direction.

9. The gas turbine engine according to claim 8, wherein the component is arranged in the turbine section.

10. The gas turbine engine according to claim 9, wherein the exterior surface is an exterior airfoil surface.

11. The gas turbine engine according to claim 8, wherein the portion includes a metering hole providing an inlet at the pocket, and the portion has a diffuser providing the exit arranged downstream from the metering hole at the exterior surface.

12. The gas turbine engine according to claim 11, wherein the portion extends along a centerline, and the diffuser has a second diffuser surface at an obtuse angle relative to adjacent exterior surface, the centerline and the second diffuser surface at a second angle relative to one another in a range of 0°-15°.

13. The gas turbine engine according to claim 8, wherein the interior flow path surface faces a cooling passage that extends in the longitudinal direction.

14. The gas turbine engine according to claim 8, wherein the portion is configured to extend is a direction corresponding to a core gas flow over the exterior surface.

15. A gas turbine engine comprising:
a compressor section;
a turbine section; and
a component arranged in one of the compressor and turbine sections, the component including:
a wall providing an exterior surface and an interior flow path surface;
a film cooling hole extending through the wall and configured to fluidly connect the interior flow path surface to the exterior surface, the film cooling hole having a pocket facing the interior flow path and extending in a longitudinal direction, the film cooling hole having a portion downstream from the pocket and arranged at an angle relative to the longitudinal direction and extending to the exterior surface, wherein the portion includes a metering hole providing an inlet at the pocket, and the portion has a diffuser providing the exit arranged downstream from the metering hole at the exterior surface, wherein the pocket has a pocket surface, and the diffuser has a first diffuser surface, the pocket surface and first diffuser surface on a same side of the wall, the pocket surface and the first diffuser surface at a first angle relative to one another in a range of 165°-180°.

* * * * *